US006449650B1

United States Patent
Westfall et al.

(10) Patent No.: US 6,449,650 B1
(45) Date of Patent: Sep. 10, 2002

(54) METHODS AND APPARATUS FOR DEPLOYING QUALITY OF SERVICE POLICIES ON A DATA COMMUNICATION NETWORK

(75) Inventors: Ronald Leonard Westfall, North Vancouver; Paul Terry, Coquitlam; John M. Siu, New Westminster; Aaron S. Mar, Vancouver, all of (CA)

(73) Assignee: Redback Networks Inc., San Jose, CA (US)

( * ) Notice: Subject to any disclaimer, the term of this patent is extended or adjusted under 35 U.S.C. 154(b) by 0 days.

(21) Appl. No.: 09/316,929

(22) Filed: May 21, 1999

Related U.S. Application Data
(60) Provisional application No. 60/118,156, filed on Feb. 1, 1999.

(51) Int. Cl.[7] .............................................. G06F 15/16
(52) U.S. Cl. ...................... 709/228; 709/227
(58) Field of Search ................................. 709/228, 227, 709/220, 232, 237; 370/395

(56) References Cited

U.S. PATENT DOCUMENTS

| | | | | |
|---|---|---|---|---|
| 4,736,363 A | | 4/1988 | Aubin et al. ................ 370/60 |
| 5,548,726 A | * | 8/1996 | Pettus .................. 352/200.09 |
| 5,719,942 A | * | 2/1998 | Aldred et al. ............... 380/49 |
| 5,777,986 A | * | 7/1998 | Grossman .................. 370/235 |
| 5,832,197 A | * | 11/1998 | Houji ................... 385/182.02 |
| 5,933,425 A | * | 8/1999 | Iwata ........................ 370/351 |
| 5,946,311 A | * | 8/1999 | Alexander, Jr. et al. ..... 370/395 |
| 5,999,598 A | * | 12/1999 | Henrick et al. .......... 379/93.07 |
| 6,075,791 A | | 6/2000 | Chiussi et al. ............. 370/412 |
| 6,094,674 A | * | 7/2000 | Hattori et al. ............. 709/203 |
| 6,199,054 B1 | * | 3/2001 | Khan et al. ................ 705/400 |

FOREIGN PATENT DOCUMENTS

| | | |
|---|---|---|
| EP | 0859492 A2 | 8/1998 |
| WO | WO 98/23080 A | 5/1998 |
| WO | WO 98/45976 | 10/1998 |
| WO | WO 00/08817 A | 2/2000 |
| WO | WO 00/0011885 A | 3/2000 |
| WO | PCT/CA 00/0938 | 6/2001 |
| WO | PCT/CA 00/00939 | 9/2001 |

OTHER PUBLICATIONS

PCT/CA 00/00940, International Search Report, 2 pages, Jul. 23, 2001.
PCT/CA 00/00937, International Search Report, 4 pages, Aug. 27, 2001.
Sally Floyd and Van Jacobson, "Link–Sharing and Resource Management Models for Packet Networks," IEEE/ACM Transactions on Networking, vol. 3, No. 4, pp. 365–386, Aug., 1995.
Laksham, T.V., et al., "High–Speed Policy–Based Packet Forwarding Using Efficient Multi–Dimensional Range Matching," Computer Communications Review, Association for Computing Machinery, New York, US, vol. 28, No. 4, Oct. 1998, pp. 203–214, XP000914436.

* cited by examiner

Primary Examiner—Glenton B. Burgess
Assistant Examiner—Kenneth W. Fields
(74) Attorney, Agent, or Firm—Blakely, Sokoloff, Taylor & Zafman LLP

(57) ABSTRACT

A network policy management system and methods define service templates. The service templates contain information on the topologies of services such as video calls, web services, order processing applications, or the like. The service templates also contain information about the quality of service required by each of the data flows which will be generated when an instance of the service is used. The policy management system allows users to add new services by selecting a service template and specifying endpoints for the service on a map of the network. The system automatically generates updated packet forwarding rules for use at a plurality of packet processing devices in the network.

22 Claims, 9 Drawing Sheets

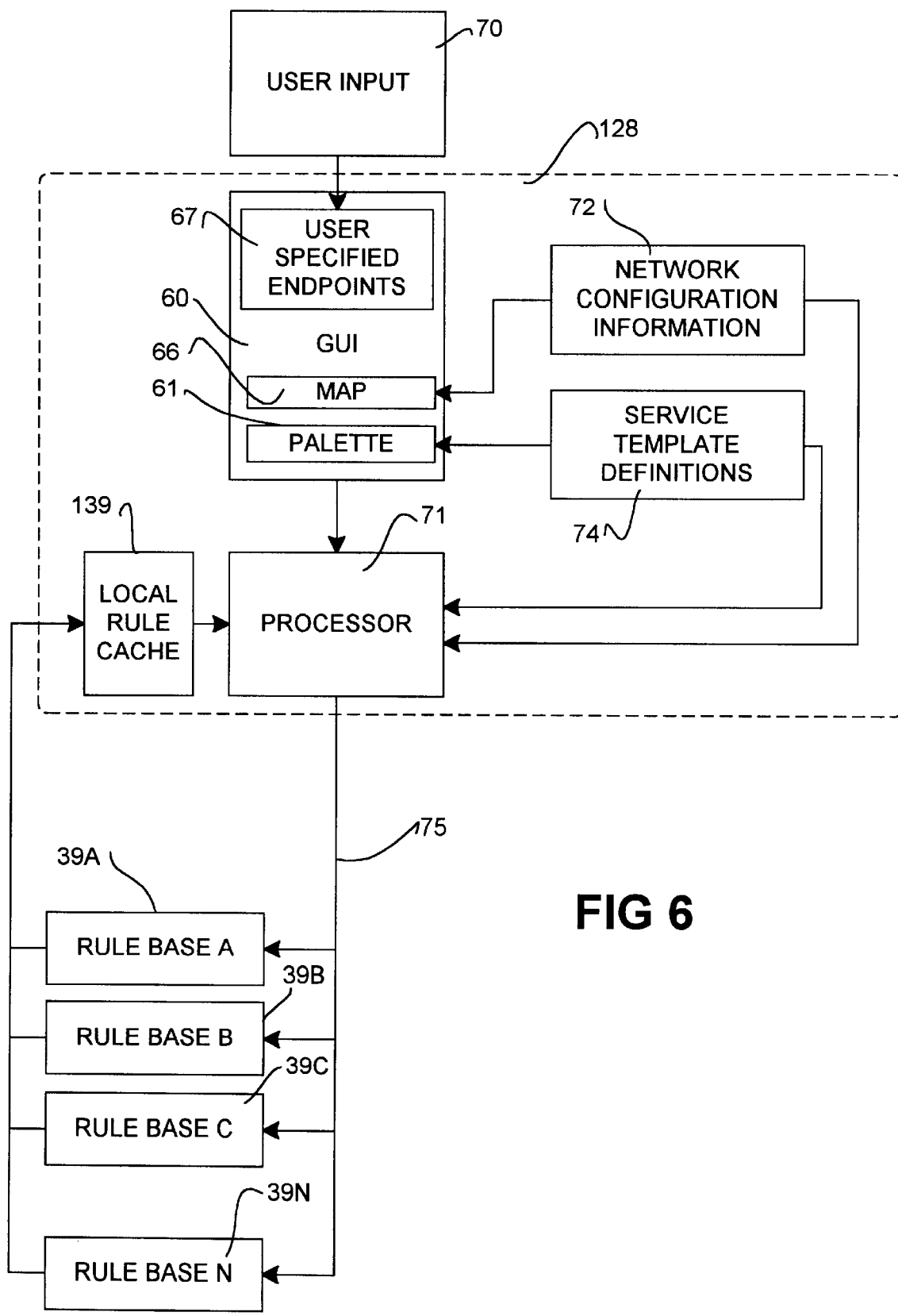

METHODS AND APPARATUS FOR DEPLOYING QUALITY OF SERVICE POLICIES ON A DATA COMMUNICATION NETWORK

CROSS REFERENCE TO RELATED APPLICATIONS

This application claims priority from U.S. provisional application No. 60/118,156 filed Feb. 1, 1999 which is entitled PACKET CLASSIFICATION METHODS AND APPARATUS, METHODS AND APPARATUS FOR DEPLOYING QUALITY OF SERVICE POLICIES ON A DATA COMMUNICATION NETWORK AND PACKET SCHEDULING METHODS AND APPARATUS.

TECHNICAL FIELD

This invention relates to data communication networks. The invention relates to systems to facilitate configuring networks to provide services to users. In particular, the invention relates to configuring networks to provide desired levels of Quality of Service ("QoS") for data communication services on the networks. The invention is particularly useful in configuring QoS in Virtual Private Networks ("VPNs") but has application in data communications networks generally.

BACKGROUND

Wide area data communication networks ("WANs") are used to carry many different types of data between geographically separated nodes. For example, the same WAN may be used to transmit video images, voice conversations, e-mail messages, data to and from database servers, and so on. Different ones of these services have different data communication requirements. For example, transmitting a video signal for a video conference requires high bandwidth, and low delay (or "latency"). Real time audio or video conferencing services can tolerate a small amount of data loss. Transmitting e-mail messages or other data can often be done with lower bandwidth. Further, it is not usually critical that e-mail be delivered instantly. E-mail services can usually tolerate longer latencies and lower bandwidth than other services. E-mail and other data transmission services can typically tolerate no data losses.

A typical WAN comprises a shared high speed network which is connected by access links to two or more geographically separated customer premises. Each of the customer premises may include one or more computers or other devices connected to the network. More typically each customer premise has a number of computers connected to a local area network ("LAN"). The LAN is connected to the WAN access link at a service point. The service point is generally at a "demarcation" unit which collects data packets from the LAN which are destined for transmission over the WAN and sends those packets across the access link. The demarcation unit also receives data packets coming from the WAN across the access link and forwards those data packets to destinations on the LAN.

Currently an enterprise which wishes to link its operations by a WAN obtains an unallocated pool of bandwidth for use in carrying data over the WAN. While it is possible to vary the amount of bandwidth available in the pool (by purchasing more bandwidth on an as-needed basis), there is no control over how much of the available bandwidth is taken by each application. While each application can, in theory, have an equal share of the available bandwidth, in practice the amount of bandwidth available to each application depends on things such as router configuration, the location(s) where data for each application enters the network, the speeds at which the application can generate the data that it wishes to transmit on the network and so on. The result is that bandwidth is allocated in a manner that bears no relationship to the requirements of individual applications or to the relative importance of the applications. There are similar inequities in the latencies in the delivery of data packets over the network.

Quality of Service ("QoS"), in general, refers to a set of parameters which describe the required traffic characteristics of a data connection. The term "quality of service" has been used by different authors to mean different things. In this specification the term QoS refers to a set of one or more of the following parameters which describe the way that a data connection treats data packets generated by an application:

Minimum Bandwidth—a minimum rate at which a data connection is capable of forwarding data originating from the application. The data connection might be incapable of forwarding data at a rate faster than the minimum bandwidth but must always be capable of forwarding data at a rate equal to the rate specified by the minimum bandwidth;

Maximum Delay—a maximum time taken for data from an application to completely traverse the data connection. QoS requirements are met only if data packets traverse the data connection in a time equal to or shorter than the maximum delay;

Maximum Loss—the maximum fraction of data packets from the application which may not be successfully transmitted across the data connection; and, Jitter—a measure of how much variation there is in the delay experienced by different packets from the application being transmitted across the data connection. In an ideal case where all packets take exactly the same amount of time to traverse the data connection the jitter is zero. Jitter may be defined, for example, as any one of various statistical measures of the width of a distribution function which expresses the probability that a packet will experience a particular delay in traversing the data connection. Different applications require different levels of QoS.

Recent developments in core switches for WANs have made it possible to construct WANs capable of quickly and efficiently transmitting vast amounts of data. Currently users pay to receive a WAN connection which provides a certain bandwidth. There is a need for a way to provide network users with control over the QoS provided to different data services which may be provided over the same network. Service providers who provide access to WANs need a way to manage and track usage of these different services. There is a particular need for relatively inexpensive apparatus and methods for facilitating the provision of such differentiated services.

Applications connected to a network generate packets of data for transmission on the network. In providing different levels of service it is necessary to be able to sort or "classify" data packets into different classes which will be accorded different levels of service. The data packets can then be transmitted in a way which maintains the required QoS for each application. Data packets generated by one or more applications may belong to the same class.

SUMMARY OF INVENTION

This invention provides methods and apparatus to facilitate the deployment of services on a computer network. The invention allows users to set up services by specifying endpoints for selected services but does not require users to have a detailed understanding of the technical requirements the services place on a computer network. Preferred embodiments of the invention automatically specify appropriate QoS levels for individual data connections in each deployed service.

One aspect of the invention provides a method for controlling connection quality in a data communication network connecting a plurality of sites. The method comprises providing at least one service template. The template comprises computer readable information specifying a service topology and computer readable information specifying QoS requirements for one or more data connections in the service. It is not necessary for an end user to know what are the QoS requirements for the service. The method accepts user input specifying two or more endpoints for the service. Then, in a programmed computer, the method generates a set of rule revisions for classifying and dispatching data packets in the one or more data connections at one or more packet processing devices in the network. The method then distributes the rule revisions to the one or more packet processing devices.

Preferably the packet processing devices each have one or more policy trees which embody rules for forwarding data packets, the rule revisions comprise new leaf nodes to be added to policy trees in the packet processing devices, and the method comprises adding the new leaf nodes to the policy trees in the packet processing devices.

Another aspect of the invention comprises a control system for a data communication network. The control system comprises: a plurality of service templates each comprising computer readable information specifying a topology for a service and computer readable information specifying QoS requirements for one or more data connections in the service and a display capable of displaying images representing the service templates. The system has one or more user input devices collectively capable of receiving a user selection identifying a selected one of the service templates and receiving user input specifying endpoints for an instance of a service corresponding to the selected service template and a processor adapted to generate rule revisions for one or more packet processing devices in the network in response to the user selection and the user input.

Further aspects and advantages of the invention are set out below.

BRIEF DESCRIPTION OF DRAWINGS

In drawings which illustrate embodiments of the invention:

FIG. 6 is a schematic view illustrating a system according to one embodiment of the invention; and, FIG. 7 is a flow diagram illustrating a method according to the invention. The invention is not limited to the embodiments shown in the drawings.

DESCRIPTION

Figure 1:
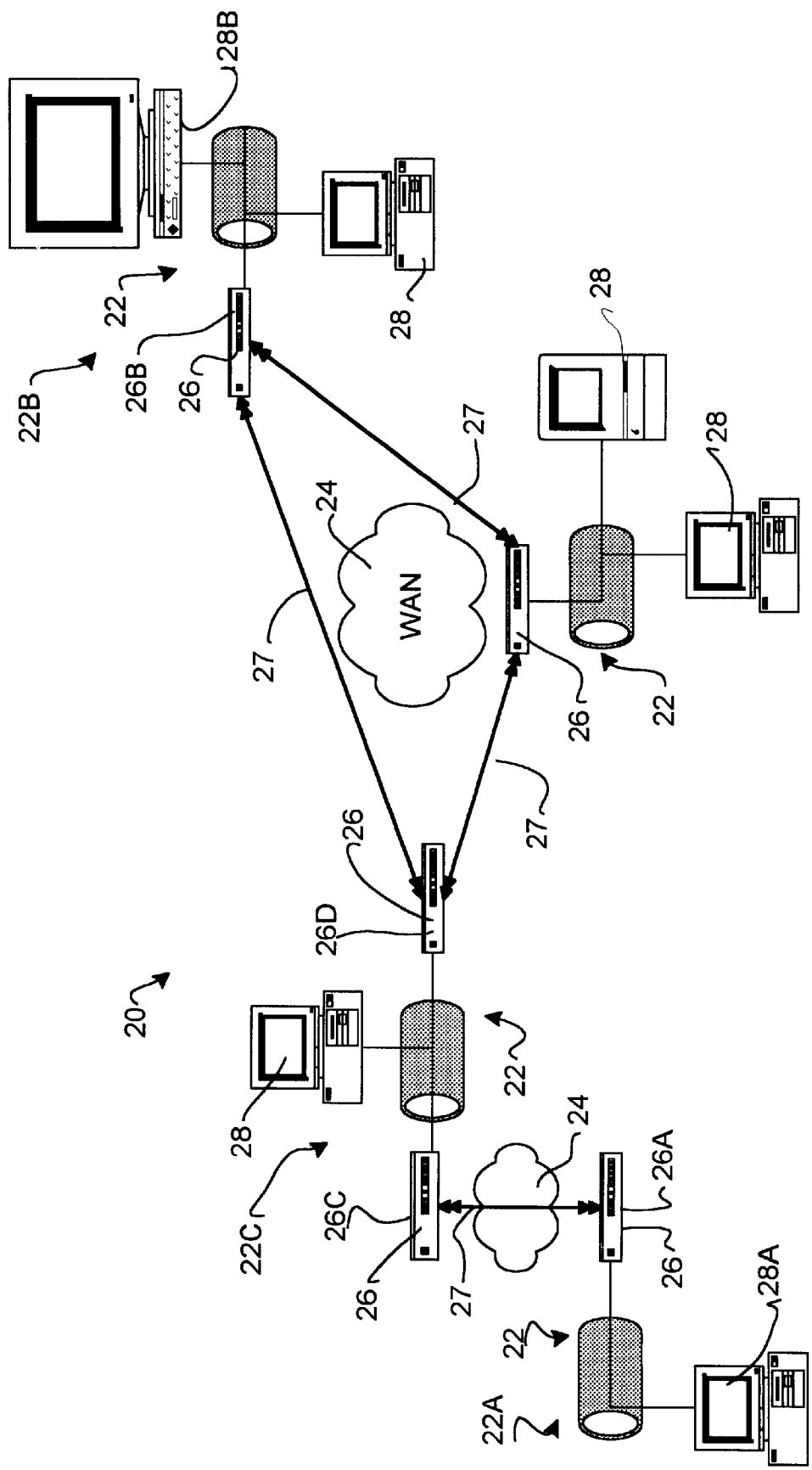
FIG. 1 schematically illustrates a small virtual private network connecting four local area networks.

This invention provides a system for the allocation of resources in a computer network. FIG. 1 shows a very simple example network 20. Network 20 comprises four local area networks ("LANs") 22 connected to one another by data links 27. Network 20 includes 4 bi-directional data links 27. Data links 27 are typically provided as shown in FIG. 1, by means of a Wide Area Network ("WAN") 24. WAN 24 may, for example, be an Asynchronous Transfer Mode ("ATM") network. Between each LAN 22 and WAN 24 is a packet processing device 26. Each LAN has a number of connected devices 28 which are capable of generating and/or receiving data for transmission on the LAN. Devices 28 typically include network connected computers.

Packet processing devices 26 receive data packets from their associated LAN 22, classify those data packets, and then forward the data packets to their destinations over WAN 24. Packet processing devices 26 also receive and process data packets from WAN 24 for delivery to devices connected to the associated LAN 22. Packet processing devices 26 may use the packet classification and scheduling methods and apparatus described in priority provisional application No. 60/118,156 filed Feb. 1, 1999 which is incorporated herein by reference. Other suitable packet classification and scheduling methods and apparatus may also be used.

Data packets may contain data being transmitted in the provision of many different kinds of services. Each service typically involves an application on a network-connected device transmitting data packets over a data connection to an application on another network connected device. A single device may be running one or more applications which each may maintain unidirectional or bi-directional connections to applications on other devices. Each connection may be called a session. Each session comprises one or more flows. Each flow is a stream of data from a particular source to a particular destination. Providing a service may involve the generation of one or more data flows. Each flow will typically include data packets carrying a different kind of information. For example, some data packets may contain video data from a real-time video conference, others may contain audio data from a two way audio conference, others may contain HTTP data and yet others may contain e-mail messages. As noted above, different services may require different levels of QoS.

Each packet processing device 26 includes a classifier which sorts data packets outgoing on each link 27 into different classes as specified by a set of classification rules. As each new packet arrives at packet processing device 26 the new packet is classified according to the classification rules. The classification rules are chosen to separate data packets which require different levels of QoS into different classes. Typically data packets in the same flow will also be in the same class. Classification typically involves extracting information intrinsic to a packet such as values for: the source address, destination address, protocol, and so on. Classification may also involve information external to the data packets such as values for the time of day, day of week, week of the year, and the input port at which the packet arrives at packet processing device 26. The classification rules each set conditions on the values of one or more parameters extracted from each packet. The conditions for a rule must be satisfied for the packet to belong to a class corresponding to the rule.

At any given time there may be many active flows for which data packets are being routed through a packet processing device 26. The classification rules may provide that a specific class is assigned to data packets in zero, one, or more than one of the active flows. Packet processing device 26 includes a scheduler which uses information about the classification of each packet to schedule the transmission of that packet so as to maintain the necessary level of QoS for the class to which the packet belongs. Some classes may be designated as "real-time" classes for which there are strict limits on latency and jitter. Other classes may be designated as "best effort classes" for which short delays in the transmission of data packets are tolerable. The scheduler may treat packets classified in real time classes preferentially relative to packets in best effort classes so as to maintain the limits on latency and jitter for packets in the real time classes. Bandwidth usage limitations may be imposed on both real time and best effort classes.

Figure 2:
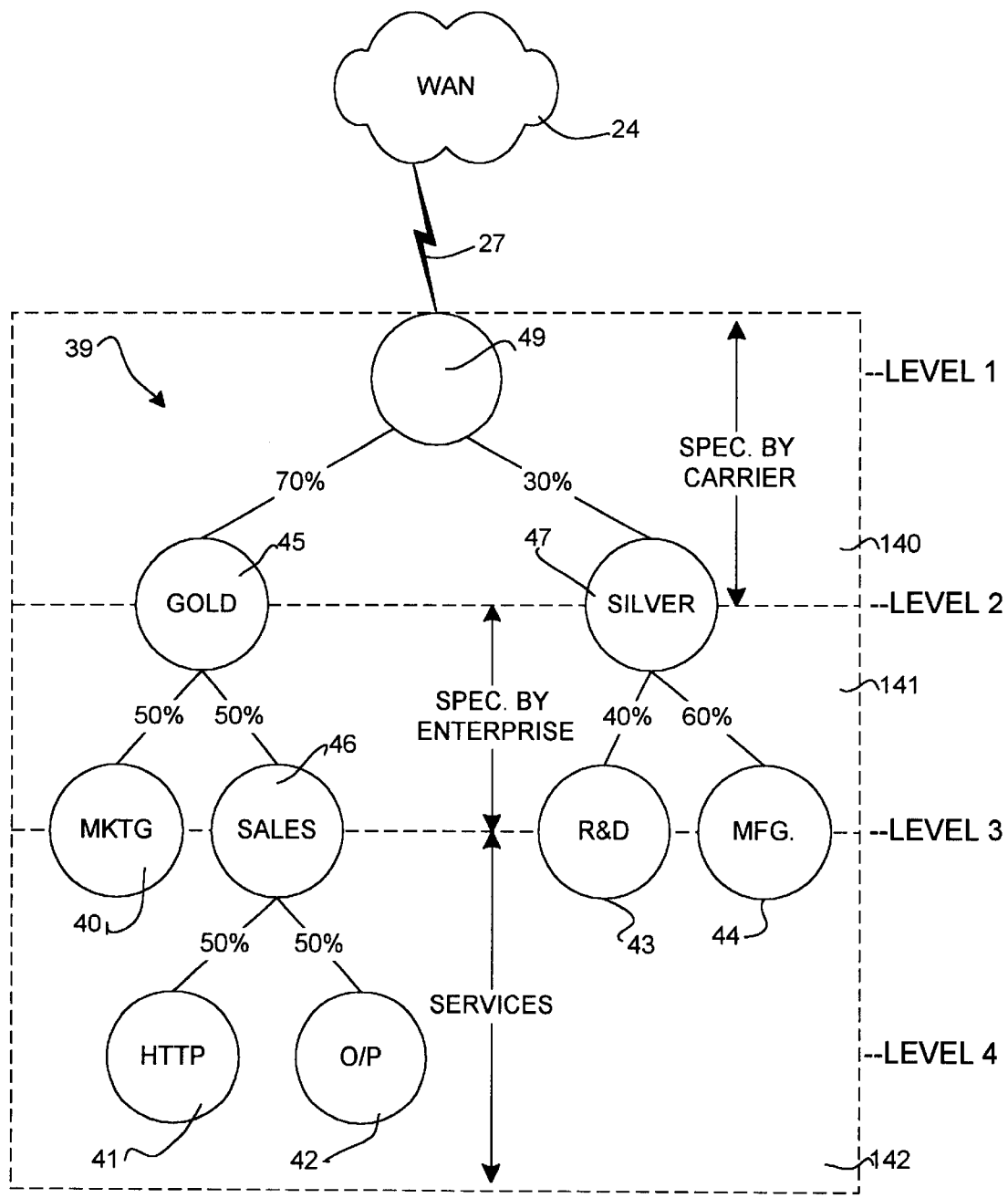
FIG. 2 is a schematic view of an example policy tree.

It can be preferable to represent the relationship between different classes by a classification tree or "policy" tree 39 (FIG. 2). The classes correspond to nodes of one or more policy trees 39. There is preferably a separate policy tree 39 for each output port of packet processing device 26. For example, There is a policy tree for the port of packet processing device 26 connected to each outgoing link 27. There is also a separate policy tree for classifying packets which are received at a packet processing device 26 from a data link 27 and which are destined for each one of the one or more ports of packet processing device 26 connected to a LAN 22.

FIG. 2 shows a simple policy tree 39. Policy tree 39 has a number of leaf nodes 40, 41, 42, 43 and 44. Each leaf node corresponds to a leaf class. Leaf nodes 40, 41, 42, 43 and 44 each depend from one of non-leaf nodes 45, 46 and 47. Top non-leaf node 49 is associated with a data link 27.

A scheduler may be structured to correspond to policy tree 39. In such a scheduler, classified packets enter the scheduler at a leaf node corresponding to a leaf class. The packets percolate upwards through non-leaf nodes of the scheduler until they reach the top node 49. From top node 49 the packets are transmitted on data link 27.

A policy tree typically has two or more levels. The policy tree 39 of FIG. 2 has 4 levels. The nodes at each level are separated from link 27 by an equal number of nodes above them in policy tree 39. We can refer to the levels in increasing ordinality starting from node 49 which can be termed a first level node because it is connected directly to data link 27. Nodes 45 and 47 may be termed "second" level nodes because they are two steps removed from link 27. Nodes 40, 43, 44 and 46 are third level nodes. Nodes 41 and 42 are fourth level nodes. In this description of policy tree 39 lower level nodes are above higher level nodes, as seen in FIG. 2.

Policy trees 39 may be used to represent policies which regulate the schedule for transmitting data packets. Each data packet is associated with successively higher nodes until the data packet reaches top (first level) node 49. In the policy tree 39 of FIG. 2, node 49 passes packets which have passed through tree 39 to WAN 24 on a data link 27. For example, a data packet classified in the class of node 42 would, when its turn comes, become associated with node 46. The data packet would then become associated with node 45. Finally the data packet would be associated with node 49 and transmitted on data link 27. Each data packet is transferred to a lower level node of policy tree 39 with a timing which, at least approximately, fairly allocates bandwidth to the flow to which the data packet belongs according to the scheme of policy tree 39.

In the example of FIG. 2, packets which pass into tree 39 at a leaf node connected below node 45 share a minimum of at least 70% of the bandwidth of link 27. Packets which pass into tree 39 at a leaf node connected below node 47 share a minimum of at least 30% of the bandwidth of link 27. Responsibility for each packet is passed from node to node, as discussed below, until the packet reaches the node at the top of tree 39.

Packets coming through node 47 may enjoy more than 30% of the bandwidth of link 27 if there is no backlog of packets at node 45 (i.e. node 45 is not using all of the minimum bandwidth to which it is entitled). If, for example, at some time there are no packets for transmission which are associated with node 45, or any node connected below node 45, then all of the bandwidth of link 27 is available to packets associated with node 47. Packets associated with node 47 arise from nodes 43 and 44.

Of the bandwidth available to packets coming through node 45, at least 50% is allocated to packets originating at leaf node 40. Leaf node 40 may, for example, contain packets which originate in MKTG. MKTG may be, for example, sources associated with a company's marketing department. The other 50% of the bandwidth available at node 45 is allocated to packets passing through node 46. Node 46 may, for example, represent sources within a company's sales department. The bandwidth available at node 46 is split between packets entering tree 39 at leaf node 41 and packets entering tree 39 at leaf node 42. Bandwidth is similarly divided between leaf nodes 43 and 44.

One feature of a policy tree, such as tree 39 is that any change made to the allocation of bandwidth between packets arriving at one node only affects packets which pass through that one node. For example, changing the allocation of bandwidth between nodes 41 and 42 from 50%-50% to 60%-40% will not affect packets which enter tree 39 through any of leaf nodes 40, 43, or 44, none of which pass through node 46. Therefore, it is possible to delegate authority to alter the structure of tree 39 below any node without the possibility that other branches of tree 39 could be affected. Another advantage of a policy tree is that excess bandwidth is made available locally before it is shared with other branches of tree 39.

Once classified the packets can be assigned to appropriate leaf nodes of tree 39 to be dispatched to their destinations.

Packet processing device 26 has a separate policy tree 39 at each of its outgoing connections to a bi-directional data link 27 or a LAN 22. No policy tree is associated with incoming interfaces from a data link 27 or a LAN 22. So, for example, the network of FIG. 1 would have 13 policy trees 39 associated with the output interfaces of the five packet processing devices 26. Interface 26A has two outgoing interfaces whereas packet processing device 26B has three outgoing interfaces.

It is necessary to alter the structure of trees 39 and to vary the bandwidth allocated to various nodes of trees 39 from time to time to promote the efficient operation of network 20 and to ensure the requisite QoS for the various data connections between locations on different pairs of LANs 22.

Configuring a network to provide different guaranteed levels of QoS for data transmitted over the network in the provision of different services to users can be both complicated and tedious. Such configuration can often be done only by highly skilled personnel who have intimate knowledge of the particular network in question. Such personnel are often in short supply and their services can be expensive. Real world computer networks are almost always much more complicated than the simple network 20 of FIG. 1.

Figure 3:
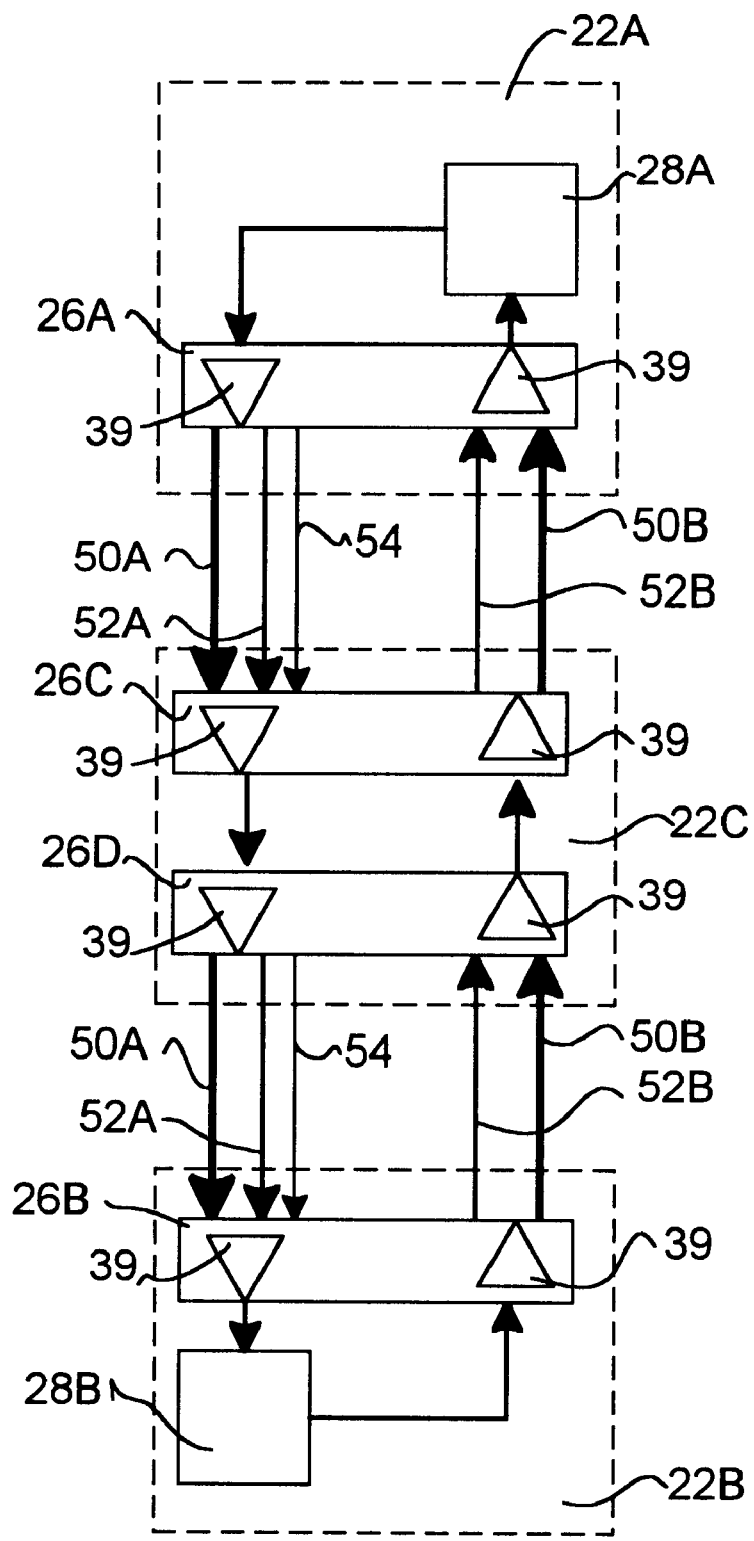
FIG. 3 is a schematic illustration showing the data connections needed to provide a video-conference service between two points on a network.

Consider, for example, the problem of setting up network 20 to provide a video-conference between a user at a computer 28A on a LAN 22A and a user at a computer 28B on a LAN 22B (FIGS. 1 and 3). This problem can be broken into several parts. First, the video-conference requires the establishment of two one-way real-time video connections 50A and 50B between LAN 22A and LAN 22B. Secondly, the video-conference requires two one-way real-time audio connections 52A and 52B between LAN 22A and LAN 22B. Thirdly, the video-conference will typically require at least one one-way control connection 54 for controlling the operation of the video-conference.

Each of video connections 50A and 50B will require high bandwidth and low latency. Each of audio connections 52A and 52B will require sufficient bandwidth for an audio link as well as low latency. Control link 54 typically may be a best effort connection having relatively low bandwidth.

To set up such a video-conference, a technician would need to set up rules in packet processing device 26A to direct the packets which make up video stream 50A, and audio stream 52A, to LAN 22B with "real time" priority. Rules will also need to be set up in packet processing device 26A to forward packets in control stream 54 on a best effort basis and to forward packets in streams 50B and 52B to LAN 22A for delivery to computer 28A with "real time" priority. The technician would also need to set up rules in packet processing device 26B to direct the packets which make up video stream 50B and audio stream 52B to LAN 22A with "real-time" priority and to forward the packets in streams 50A and 52A to computer 28B on LAN 22B with "real time" priority. The technician would also need to provide rules in packet processing devices 26A and 26B to pass packets in control stream 54 with "best effort" priority. The technician will also need to provide rules in packet processing devices 26C and 26D to pass each of these streams through LAN 22C. Each set of rules is provided in the form of a policy tree 39. The technician will need to adjust each policy tree to provide enough bandwidth for each of these streams so that the packets which make up each of these streams are transmitted with low enough latency to provide the necessary level of QoS.

To set up rules corresponding to each of these streams, the technician will require technical information about the network including the destination IP address for packets in each stream, the bandwidth required for each stream, any other QoS requirements for each stream and so on.

In this example, it is necessary to set up eight different policy trees in four separate packet processing devices to provide a single video-conference service between two endpoints. The complexity is even greater for services which involve more than two endpoints. For example, a client/server application may require two way communication between a server and many clients located at different locations across the network. The two way communication may require greater bandwidth in one direction than in the other direction. Furthermore, the bandwidth requirements will be larger on parts of the network closer to the server which are traversed by traffic originating from a larger number of clients than will be the bandwidth requirements in parts of the network farther from the server.

This invention dramatically simplifies the task of configuring a network to provide communication services between different nodes on a network. The invention does this by providing service templates. Each service template contains information about the topology of and nature of the data connections required by a service. The service template includes information which:

1. identifies types of endpoints that can participate in providing and consuming the service;
2. defines data connections between the endpoints;
3. specifies the Quality of Service required by each of the data connections; and,
4. specifies at least partial information about how to classify data packets so as to associate them with data connections of the service.

As an example the service template may specify a Quality of Service for a data connection by specifying a minimum bandwidth which must be available for each data connection and whether data in the connection must be delivered on a "real time" basis or whether a best effort connection will suffice. The service template is not specific as to the locations of the endpoints of the data connection(s) required to provide a service.

All of the information needed to set up the data connections necessary to provide a service on a network can be found in the service template for that service along with separate knowledge of the topology of the network and specified endpoints for data connections defined in the service template. Each service template preferably specifies values for some parameters that can be used in identifying (classifying) those data packets which are being transmitted on one of the data connections for the corresponding service.

Figure 4A:
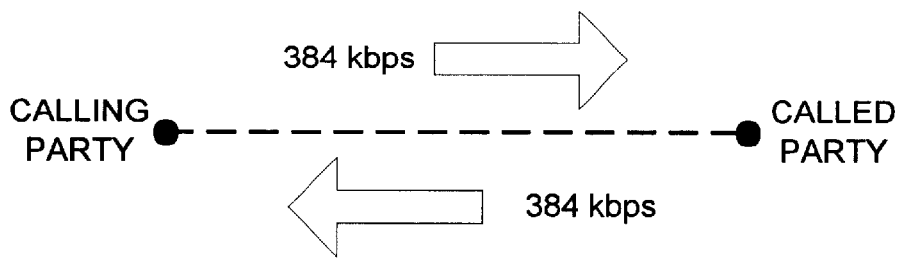
FIGS. 4A and 4B illustrate topologies for a videoconference service and a order processing application service respectively.
Figure 4B:
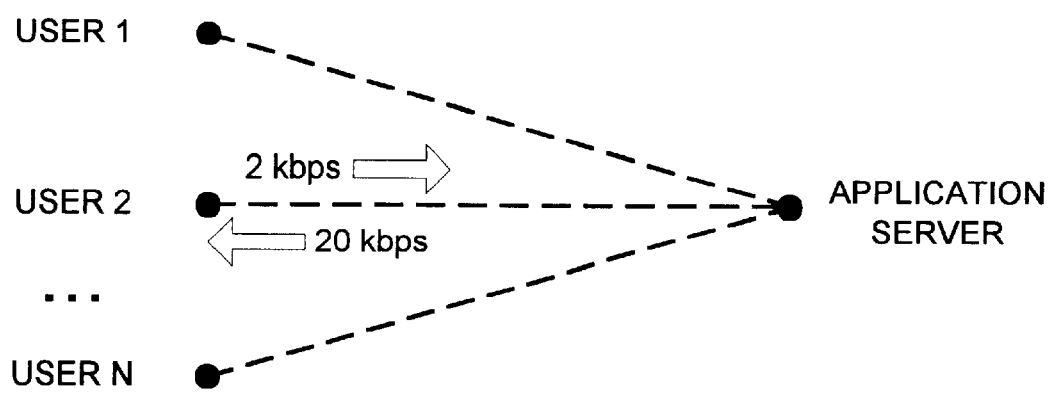

A single service template may specify several data connections between two or more different endpoints on the network. Services for which service templates may be provided include, for example, video-conferencing, audio conferencing, web services provided by a web server to one or more web clients, e-mail services, specific client/server applications, and so on. FIGS. 4A and 4B show topologies for several types of service. FIG. 4A shows the topology for a video call service between a calling party and a called party. FIG. 4B shows the topology for an client/server order processing application.

A service template for a video call, for example, would specify that the video call service requires real-time video and audio connections to and from each of two-users as well as whatever control connections are necessary. The service template specifies bandwidth and whether each connection has "real time" priority or "best effort" priority. A service template could also specify other QoS requirements for the connections.

As noted above, a service template preferably specifies values, or ranges of values, that will identify packets which are being transmitted over the various connections of the service in question. A service template does not specify values which will vary with each particular instance of the service. For example, packets in a network 20 may be classified according to values for the parameters listed in Table I.

TABLE I

| | Example Parameters for Classification |
|---|---|
| 1 | source IP address/subnet |
| 2 | destination IP address/subnet |
| 3 | input port of a device 26 at which packet was received |
| 4 | source TCP/UDP port |
| 5 | destination TCP/UDP port |
| 6 | protocol |
| 7 | type of service ("TOS") |
| 8 | acknowledgement ("ACK") |

A service template would not include values for any of the first three parameters of Table I as those parameters are specific to each individual instance of a service. The service template may provide values for all of the remaining parameters of Table I.

It takes significant technical expertise to design a service template. However, once a template has been designed it can be made straightforward to provide an instance of the service by specifying endpoints for the instance of the service. Thus, business personnel with relatively low technical expertise can create instances of services to suit their business needs without the need for constant competent technical assistance.

A preferred embodiment of the invention provides a computer network which has a computer user interface through which a user can select one or more predefined service templates and choose end points for those service templates to create instances of the desired services. The user interface is preferably a graphical user interface. The invention may provide a user interface directly or may provide an Application Programming Interface ("API") so that third parties may provide their own suitable user interfaces for use in selecting endpoints for services.

The system modifies policies in the network by altering packet classification rules as required to implement the desired services. The user interface may be provided on a computer dedicated to the task of network configuration or may be provided in software which may run on any computer connected to the network. The system may be used by a user to allocate resources on a Virtual Private Network.

Figure 5A:
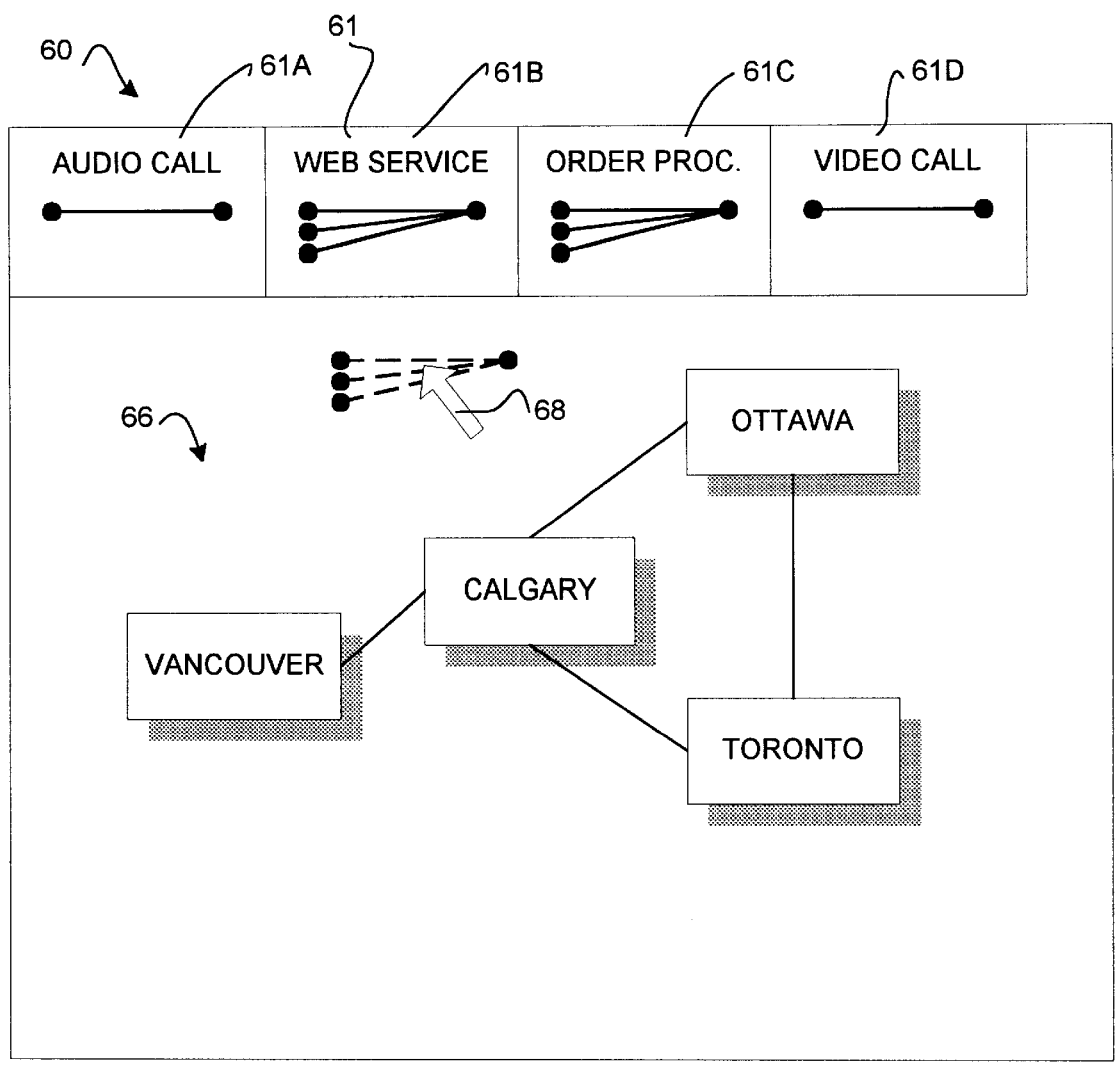
FIGS. 5A, 5B and 5C illustrates a graphical user interface for a system according to the invention.
Figure 5B:
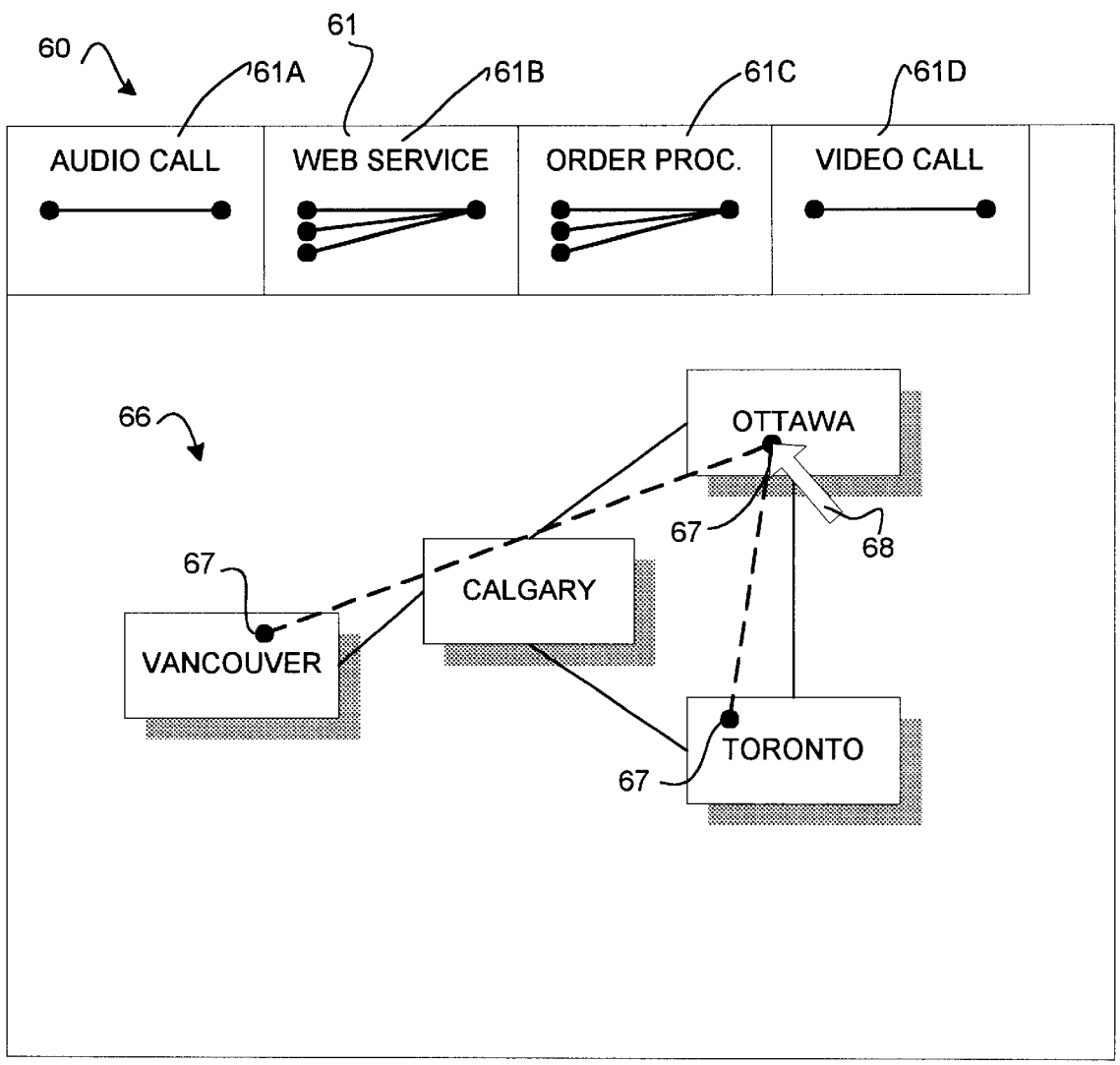
Figure 5C:
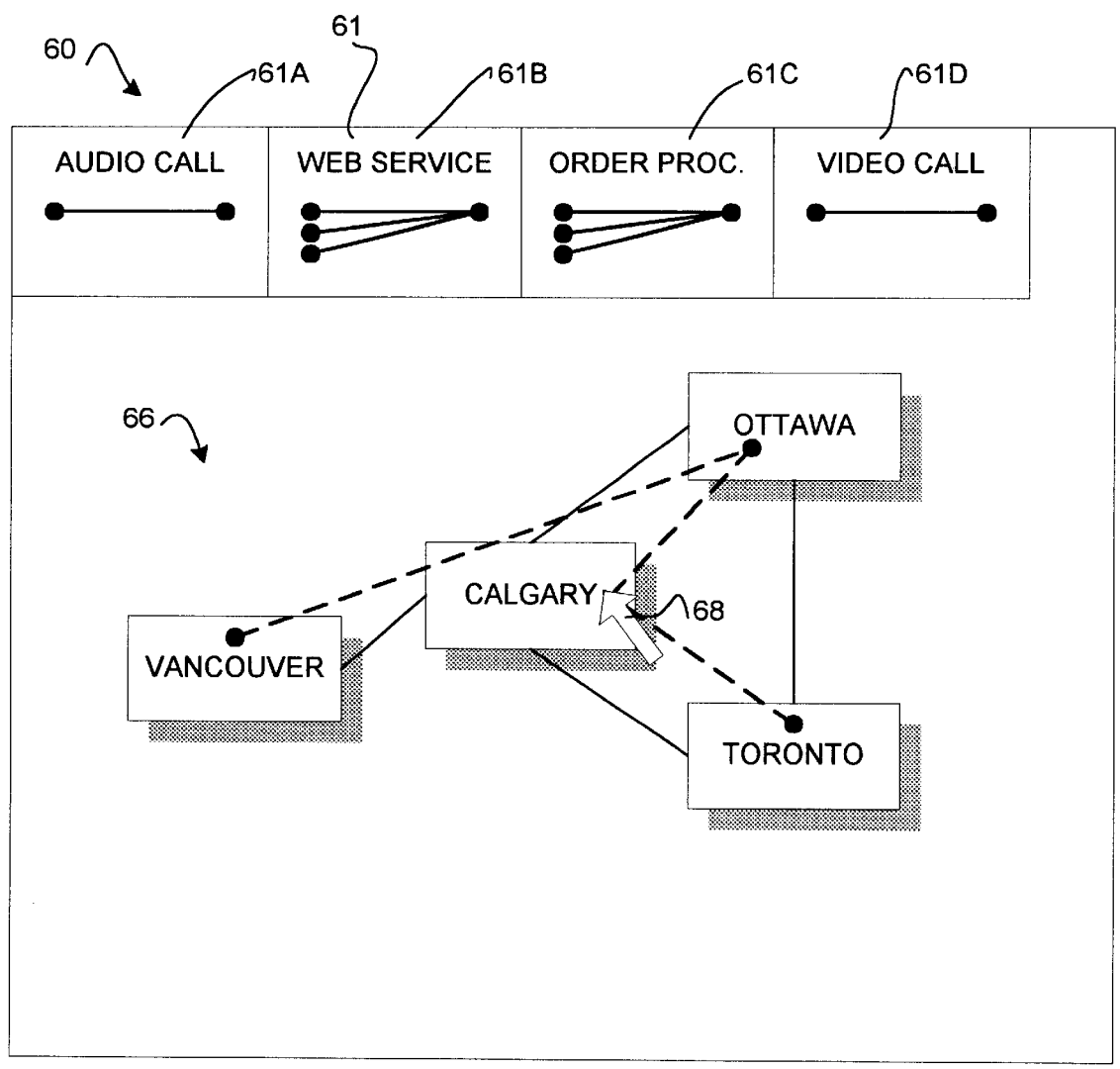

Preferably the interface is a graphical interface which provides a visual representation of the network as well as a number of icons representing different service templates. An example of such a graphical interface is shown in FIGS. 5A through 5C. FIG. 5A shows an interface 60 which includes a map 66 showing the topology of a network 20 (FIG. 1). Of course, the addresses of each location identified on map 66 is known (even though it may not be known to a person using interface 60).

Interface 60 includes a palette 61 which displays a number of icons 61A, 61B, 61C and 61D which represent pre-defined service templates. A user can create an instance of a service on network 20 by dragging one of icons 61A–61D corresponding to a desired service onto map 66 with a cursor 68 controlled by a mouse or other suitable input device. This places on map 66 a representation of the topology of the selected service. The user can then drag endpoints of the service representation to the desired points on map 66. FIG. 5B shows an example in which a user has added a web service with a server in Ottawa and clients in Vancouver and Toronto. Map 66 could include representations of the host computers on each LAN 22 if this information is available at the computer on which user interface 60 is running.

FIG. 6 illustrates a system according to the invention. Graphical user interface 60 is provided on a workstation 128 connected to network 20. After a user has selected endpoints 67 for the selected service by providing user input 70 then all of the information needed to create rules for the forwarding of data packets for the service is available to a processor 71 in workstation 128. Processor 71 includes one or more computer processors and compatible computer software which causes processor 71 to operate as described herein.

Most of the information is stored in a definition 74 of the service template chosen. The subnets and/or individual addresses which make up the endpoints for the service (and which will be identified in the source and destination addresses for packets dispatched in providing the service) are the subnets and/or individual addresses which correspond to the endpoints 67 on map 66 with which the user has associated the endpoints for the service. Workstation 128 has access to stored network configuration information 72 which includes the addresses of elements identified on map 66. Since the connections in the topology defined in a service template will map naturally to links 27 in network 20 the packet processing devices 26 through which each data connection will pass and the input ports at which packets in each of the connections will arrive at each packet processing device 26 are also readily identified by the software.

When a user adds a service, processor 71 can automatically generate one or more new leaf nodes to add to the policy tree 39 at each output port involved in supporting the service. The packets to be classified as belonging to each of the leaf nodes can be identified by a set of packet classification rules generated by processor 71. The classification rules permit each packet processing device 26 to identify packets passing through that packet processing device 26 in the performance of the service. The classification rules can be automatically generated from the information in the service template for that service, the user-specified endpoints 67, and input ports determined by the the paths through network 20 taken by each data connection between endpoints 67.

As noted above, each service template specifies the level of QoS that should be accorded to one or more connections which will be generated when the service is being used. In a currently preferred embodiment, each service template specifies a minimum bandwidth for each connection and whether the connection is a real time or best effort connection. When a new leaf node is generated then the amount of bandwidth which should be allocated to that leaf node (as expressed as a percentage) can be determined as follows:

$$BW\%_i = \frac{BW_i}{\sum_i BW_i} \times 100\% \qquad (1)$$

Where $BW\%_i$ is the minimum percentage of bandwidth of a parent node to which a leaf node is entitled, $BW_i$ is the minimum bandwidth specified for the leaf node and the sum is taken over all leaf nodes who are children of the parent node. The absolute bandwidth requirement of a non-leaf node is given by the sum of the bandwidth requirements of all leaf nodes which are connected below the non-leaf node in a policy tree 39. Therefore adding a new leaf node to a policy tree 39 will alter the percentage allocation of bandwidth at each level of the policy tree 39.

The policy represented by a policy tree 39 may specify QoS by providing a desired distribution of bandwidth between different child nodes which depend from the same parent node in various equivalent ways. For example, policy tree 39 may specify absolute amounts of bandwidth to be provided to individual nodes or percentages of available bandwidth to be shared by each of two or more child nodes, or a combination of these measures, or any equivalent measure.

With the information obtained from a service template and user-specified endpoints, processor 71 can automatically generate control messages for distribution over a communication path 75 provided on network 20 to each affected one of packet processing devices 26. The control messages cause the new classification and scheduling rules to be added to policy trees 39A, 39B, 39C etc. so that packet processing devices 26 will handle data packets associated with the service in the desired manner. Processor 71 preferably has access to a local rule cache 139 which contains the one or more sets of rules for each packet processing device 26. In the preferred embodiment of the invention, each rule base comprises a policy tree 39. Preferably the control messages cause new leaf nodes to be added to policy trees 39 at each affected output port in network 20 and alter the allocation of bandwidth between different nodes in each policy tree 39 to reflect the addition of the new node.

When a service template is changed (for example, if it is decided to increase bandwidth in a template for video conferences to provide increased frame rate) then processor 71 selects the services which use the changed service template and recalculates the allocation of bandwidth in any policy trees used by those services. Processor 71 then sends control messages to update any affected policy trees 39. Similarly if a service is changed (for example, by moving an endpoint of the service) then processor 71 computes any resulting changes to policy trees 39 and then sends control messages to update any affected policy trees 39. Where an endpoint for a service is moved processor 71 may delete leaf nodes from some policy trees 39 and add leaf nodes to other policy trees 39.

Preferably the invention permits a user to delete services which have been previously set up. Where a service is to be deleted then processor 71 can generate one or more control messages which cause leaf nodes of policy trees 39 which were provided for the deleted service to be removed from policy trees 39 in packet processing devices 26.

Where packet scheduling classes are leaf nodes of hierarchical policy trees 39, as is preferred, it may be desired to define some portions of each policy tree in a way that cannot be altered by most users. For example, the carrier who provides WAN 24 may choose to provide a root portion 140 (FIG. 2) of trees 39. For example, the carrier may wish to provide a "GOLD" service (node 45) which provides high bandwidth at a premium price and a "SILVER" service (node 47) which provides lower bandwidth at a more modest cost. The enterprise who maintains the virtual private network may wish to specify an intermediate portion 141 of tree 39. For example, the enterprise might wish to provide branches of tree 39 for the main divisions within the enterprise. Finally, users within divisions may be permitted to add classes by setting up services to be used by their division as indicated in region 142 of FIG. 2. The added classes are represented as leaf nodes of tree 39. The particular policy tree 39 of FIG. 2 is an example only.

In some cases a user will have authority to add rules below two or more different nodes on trees 39. If this is the case then processor 71 may require the user to specify the point on tree 39 to which rules for a new service should be added.

Most preferably processor 71 computes the aggregate bandwidth allocated to each data link of network 20 by all services which are configured to use that data link and compares this to the known capacity of the data link according to network information base 72. If a data link is oversubscribed then processor 71 may generate a warning or may not permit the addition of the service to a policy tree 39 that controls traffic using the data link.

Processor 71 may allow a user to fine tune the allocation of network resources by altering the path taken by one or more connections of a service. This is preferably done through the use of graphical interface 60. For example, FIG. 5C shows a situation wherein a user has manually dragged a midpoint of a link joining a web server in OTTAWA to a web client in TORONTO to CALGARY on map 66. This will cause packets from the web server which are destined for OTTAWA to be delivered across network 20 via CALGARY. In the alternative, processor 71 may provide for automatic optimization of deployed services by using standard optimization algorithms (which are known to those skilled in the art and are therefore not described herein). Such algorithms include, for example, various kinds of genetic algorithms, stochastic annealing algorithms and various algorithms implemented through linear programming.

Figure 7:
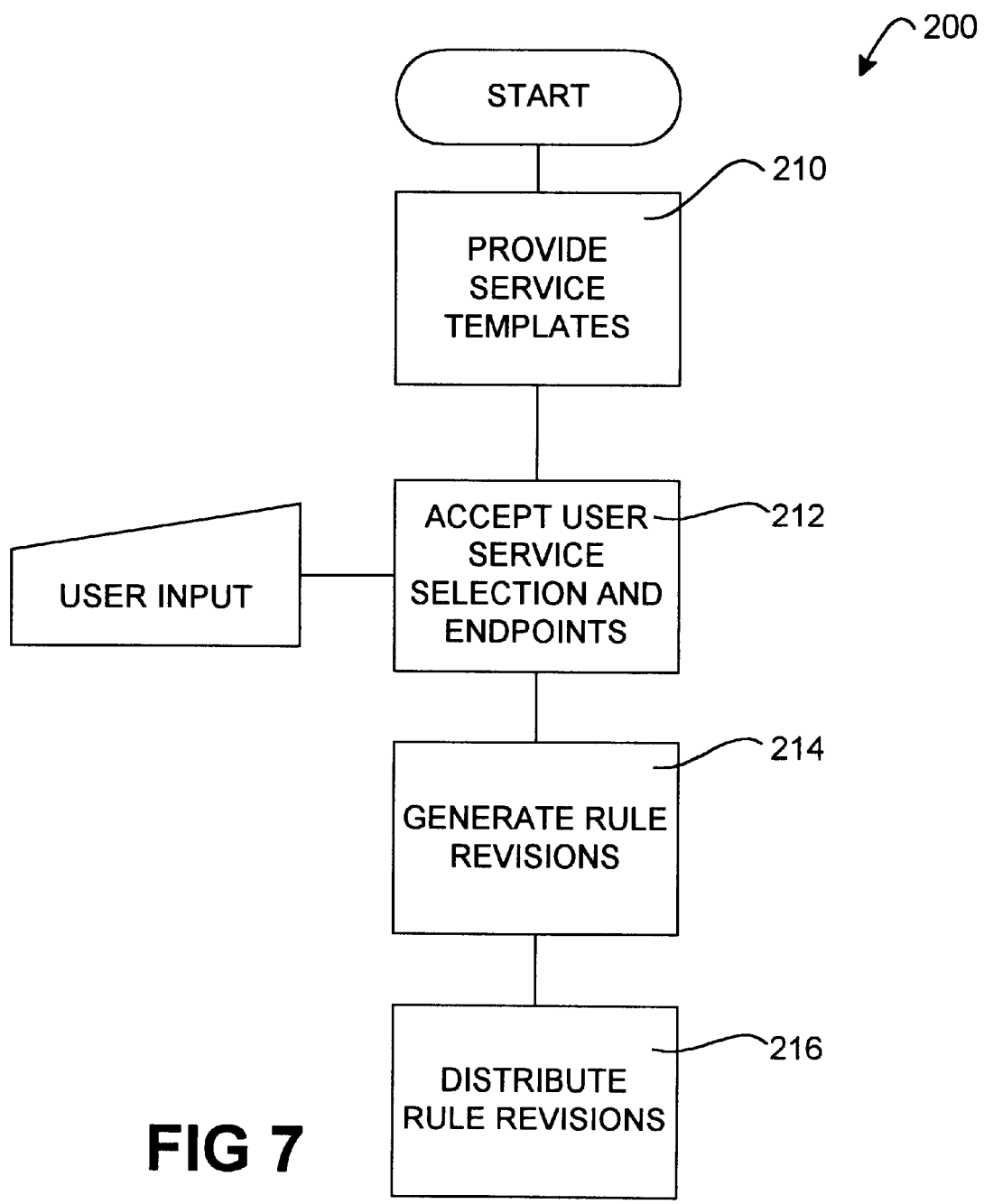

FIG. 7 is a flow diagram illustrating a method 200 according to the invention. The method begins by providing one or more service templates (step 210). Each service template includes a computer readable description of a service's topology and computer readable information about the capacity and other QoS requirements on any connections which must be provided to implement the service. The method continues by accepting user input to select a service and specify endpoints for the service (step 212). From the information in the selected service template and the user provided information the method continues by generating new rules to be added to one or more packet processing devices in the network (step 214). The new rules classify packets of any flows which will be required in providing the service. The new rules also schedule the dispatch of packets in those flows to provide the level of QoS specified in the service template. Finally, rule update messages are distributed (step 216) over the network to the packet processing devices to which they pertain. The update messages cause the packet processing devices 26 to implement the new rules. In preferred embodiments of the invention, implementing a new rule comprises adding a leaf node corresponding to the new rule to a policy tree 39 attached to an output port and adjusting the bandwidth allocations among nodes of the policy tree to provide the necessary bandwidth to the new service. If there are existing services then the policy update messages may delete or change leaf nodes of policy trees 39 to reflect changes in services or service templates.

Preferably step 212 includes allowing a user to select a service from a palette containing icons representing different services templates. Preferably step 212 also includes displaying a map of the network on a graphical user interface and allowing the user to select endpoints for a selected service by dragging endpoints on a visual representation of the service and dropping those endpoints onto locations on the map with a suitable pointing device.

As will be apparent to those skilled in the art in the light of the foregoing disclosure, many alterations and modifications are possible in the practice of this invention without departing from the spirit or scope thereof. For example, a mouse has been used as an example of an input device. The input device could be any other pointing device or any other type of input device, such as a keyboard, voice recognition circuitry, a touch sensitive screen, or any other device capable of being used by a user to provide the necessary user inputs.

The system has been described as including a workstation 128. While it will likely be most practical to practice the invention by providing a single programmed computer workstation connected to the network in question, the functions necessary for practising the invention could conceivably be provided by a number of computers connected to the network or by custom built hardware or hardware/software platforms.

While the invention has been described as modifying scheduling rules which include policy trees, the invention could be practised on networks which implement class based queuing ("CBQ") or Weighted Fair Queuing ("WFQ") algorithms in which the different classes are not represented as policy trees. In such cases, implementing the new rules may involve adding new rules to a rule base in a packet processing device.

While packet processing devices 26 have been described as being network edge devices, packet processing devices 26 could also include any packet processing devices in network 20.

While the invention has been described as receiving user input from a GUI, the invention could also be implemented by providing a suitable Application Programming Interface ("API"). Processor 71 can then receive instructions regarding the deployment of new services or the modification or deletion of existing services through the API. Functions provided by the API could be invoked by software provided by third parties.

Preferred implementations of the invention may include a computer system programmed to execute a method of the invention. The invention may also be provided in the form of a program product. The program product may comprise any medium which carries a set of computer-readable signals corresponding to instructions which, when run on a computer, cause the computer to execute a method of the invention. The program product may be distributed in any of a wide variety of forms. The program product may comprise, for example, physical media such as floppy diskettes, CD ROMs, DVDs, hard disk drives, flash RAM or the like or transmission-type media such as digital or analog communication links.

Accordingly, the scope of the invention is to be construed in accordance with the substance defined by the following claims.

What is claimed is:

1. A method for controlling connection quality in a data communication network connecting a plurality of sites, the method comprising:
   a) providing a stored service template comprising computer readable information specifying a service topology for a service and computer readable information specifying QoS requirements for one or more data connections the service, wherein the service template comprises:
      (i) information specifying types of endpoints that can participate in providing and consuming the service;
      (ii) information defining data connections between the endpoints;
      (iii) information specifying a Quality of Service required by each of the data connections; and,
      (iv) information specifying at least partial information about how to classify data packets so as to associate them with data connections of the service;
   b) accepting user input specifying two or more endpoints for the service;
   c) in a programmed computer generating from the computer readable information in the template and the user input a set of rule revisions for classifying and dispatching data packets in the one or more data connections at one or more packet processing devices in the network; and,
   d) implementing the service by distributing the rule revisions to the one or more packet processing devices.

2. The method of claim 1 comprising displaying on a display device a map of the network wherein accepting user input specifying two or more endpoints for the service comprises accepting user input specifying two or more locations on the map.

3. The method of claim 2 wherein accepting user input specifying two or more endpoints for the service comprises displaying a visual representation of the selected service and permitting a user to drag endpoints of the visual representation of the service and drop those endpoints onto locations on the map with a pointing device.

4. The method of claim 3 wherein providing a service template comprises providing a plurality of service templates and the method includes allowing a user to select one of the plurality of service templates before accepting user input specifying two or more endpoints for the service.

5. The method of claim 4 wherein allowing a user to select one of the plurality of service templates comprises allowing a user to select an icon representing a service template from a palette containing a plurality of icons each representing a different service template of the plurality of service templates.

6. A method for controlling connection quality in a data communication network connecting a plurality of sites, the method comprising:
   a) providing a stored service template comprising computer readable information specifying a service topology for a service and computer readable information specifying QoS requirements for one or more data connections the service;
   b) accepting user input specifying two or more endpoints for the service;
   c) in a programmed computer generating from the computer readable information in the template and the user input a set of rule revisions for classifying and dispatching data packets in the one or more data connections at one or more packet processing devices in the network, wherein the rule revisions comprise new leaf nodes to be added to policy trees in the packet processing device, the method comprising adding the new leaf nodes to the policy trees in the packet processing device; and
   d) implementing the service by distributing the rule revisions to the one or more packet processing devices.

7. The method of claim 6 wherein the policy trees each comprise a plurality of predefined nodes and wherein the new leaf nodes are each added to one of the predefined nodes.

8. The method of claim 7 comprising allocating to each of the new leaf nodes a bandwidth given by:

$$BW\ \%_i = \frac{BW_i}{\sum_i BW_i} \times 100\%$$

where $BW\%_i$ is a percentage of bandwidth of the predefined node which is a parent to the new leaf node, $BW_i$ is the minimum bandwidth specified for the new leaf node and the sum is taken over all leaf nodes who are children of the predefined node which is a parent to the new leaf node.

9. A method for controlling connection quality in a data communication network connecting a plurality of sites, the method comprising:
   a) providing a stored service template comprising computer readable information specifying a service topology for a service and computer readable information specifying QoS requirements for one or more data connections the service; accepting user input specifying two or more endpoints for the service;
   b) in a programmed computer generating from the computer readable information in the template and the user input a set of rule revisions for classifying and dispatching data packets in the one or more data connections at one or more packet processing devices in the network; and,
   c) implementing the service by distributing the rule revisions to the one or more packet processing devices;

d) receiving an altered version of a service template;

e) in a programmed computer identifying one or more previously set up services which are based upon the service template;

f) in the programmed computer generating a set of rule revisions to change the previously set up services to be based upon the altered version of the service template; and, g) distributing the rule revisions to the one or more packet processing devices.

10. The method of claim 9 wherein accepting user input specifying two or more endpoints for the service comprises providing an API and accepting user input through the API.

11. The method of claim 9 comprising displaying on a display device a map of the network wherein accepting user input specifying two or more endpoints for the service comprises accepting user input specifying two or more locations on the map.

12. The method of claim 11 wherein accepting user input specifying two or more endpoints for the service comprises displaying a visual representation of the selected service and permitting a user to drag endpoints of the visual representation of the service and drop those endpoints onto locations on the map with a pointing device.

13. The method of claim 12 wherein providing a service template comprises providing a plurality of service templates and the method includes allowing a user to select one of the plurality of service templates before accepting user input specifying two or more endpoints for the service.

14. The method of claim 13 wherein allowing a user to select one of the plurality of service templates comprises allowing a user to select an icon representing a service template from a palette containing a plurality of icons each representing a different service template of the plurality of service templates.

15. A method for controlling connection quality in a data communication network connecting a plurality of sites, the method comprising:

a) providing a stored service template comprising computer readable information specifying a service topology for a service and computer readable information specifying QoS requirements for one or more data connections the service;

b) accepting user input specifying two or more endpoints for the service;

c) in a programmed computer generating from the computer readable information in the template and the user input a set of rule revisions for classifying and dispatching data packets in the one or more data connections at one or more packet processing devices in the network;

d) implementing the service by distributing the rule revisions to the one or more packet processing devices;

e) accepting user input specifying changes to one or more endpoints for a previously set up service;

g) in the programmed computer generating a set of rule revisions to change the one or more endpoints for the previously set up services; and h) distributing the rule revisions to the one or more packet processing devices.

16. The method of claim 15 wherein providing a service template comprises providing a plurality of service templates and the method includes allowing a user to select one of the plurality of service templates before accepting user input specifying two or more endpoints for the service.

17. The method of claim 15 wherein the rule revisions comprise new leaf nodes to be added to policy trees in the packet processing device, the method comprising adding the new leaf nodes to the policy trees in the packet processing device.

18. The method of claim 17 wherein the policy trees each comprise a plurality of predefined nodes and wherein the new leaf nodes are each added to one of the predefined nodes.

19. The method of claim 18 comprising allocating to each of the new leaf nodes a bandwidth given by:

$$BW\%_i = \frac{BW_i}{\sum_i BW_i} \times 100\%$$

where $BW\%_i$ is a percentage of bandwidth of the predefined node which is a parent to the new leaf node, $BW_i$ is the minimum bandwidth specified for the new leaf node and the sum is taken over all leaf nodes who are children of the predefined node which a parent to the new leaf node.

20. A method for controlling connection quality in a data communication network connecting a plurality of sites, the method comprising:

a) providing a stored service template comprising computer readable information specifying a service topology for a service and computer readable information specifying QoS requirements for one or more data connections the service;

b) accepting user input specifying two or more endpoints for the service;

c) in a programmed computer generating from the computer readable information in the template and the user input a set of rule revisions for classifying and dispatching data packets in the one or more data connections at one or more packet processing devices in the network; and, implementing the service by distributing the rule revisions to the one or more packet processing devices;

d) accepting user input specifying one or more previously set up services to be deleted;

e) in the programmed computer generating a set of rule revisions to delete the previously set up services; and f) distributing the rule revisions to the one or more packet processing devices.

21. The method of claim 20 wherein accepting user input specifying two or more endpoints for the service comprises displaying a visual representation of the selected service and permitting a user to drag endpoints of the visual representation of the service and drop those endpoints onto locations on the map with a pointing device, and wherein accepting user input specifying one or more previously set up services to be deleted comprises displaying a visual representation of a delete selected service option and permitting a user to activate the delete selected service option with a pointing device.

22. The method of claim 20 comprising displaying on a display device a map of the network wherein accepting user input specifying two or more endpoints for the service comprises accepting user input specifying two or more locations on the map.

* * * * *